United States Patent
Watanabe (10) Patent No.: US 9,260,132 B2
(45) Date of Patent: Feb. 16, 2016

(54) STEERING APPARATUS AND CONTROL METHOD THEREOF

(71) Applicant: Ryouchi Watanabe, Susono (JP)

(72) Inventor: Ryouchi Watanabe, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/076,684

(22) Filed: Nov. 11, 2013

(65) Prior Publication Data

US 2014/0142810 A1    May 22, 2014

(30) Foreign Application Priority Data

Nov. 20, 2012 (JP) .................................. 2012-254336

(51) Int. Cl.
| | | |
|---|---|---|
| B62D 6/00 | (2006.01) | |
| B62D 5/04 | (2006.01) | |
| B60G 17/018 | (2006.01) | |
| G06F 7/00 | (2006.01) | |
| B62D 15/02 | (2006.01) | |

(52) U.S. Cl.
CPC ............ *B62D 5/0481* (2013.01); *B60G 17/018* (2013.01); *B62D 15/0245* (2013.01); *G06F 7/00* (2013.01)

(58) Field of Classification Search
CPC .............................. B60W 10/06; B60G 17/018
USPC .............. 701/31.4, 36, 42, 70, 41; 303/113.4, 303/114.3
See application file for complete search history.

(56) References Cited

U.S. PATENT DOCUMENTS

| | | | | |
|---|---|---|---|---|
| 6,152,254 | A * | 11/2000 | Phillips ................ | B62D 5/0463 180/421 |
| 7,206,702 | B2 * | 4/2007 | Isono ...................... | B60T 8/172 701/70 |
| 8,108,097 | B2 * | 1/2012 | Mattes .................... | B60T 8/172 340/435 |
| 2006/0259225 | A1 * | 11/2006 | Ono ...................... | B60G 17/016 701/82 |
| 2007/0095588 | A1 * | 5/2007 | Mattes .................... | B60T 8/172 180/197 |
| 2007/0192003 | A1 * | 8/2007 | Hashiba ............... | B60G 17/018 701/37 |

(Continued)

FOREIGN PATENT DOCUMENTS

| | | |
|---|---|---|
| JP | 04-236320 A | 8/1992 |
| JP | 06171531 A | 6/1994 |

(Continued)

*Primary Examiner* — Thomas G Black
*Assistant Examiner* — Wae Louie
(74) *Attorney, Agent, or Firm* — Dinsmore & Shohl LLP (57) ABSTRACT

A steering apparatus includes: a steering angle zero point detection unit configured to detect a zero point of a steering angle of a steering wheel; a history recording unit configured to record a detection history of the zero point; a characteristic variation determination unit configured to determine whether or not characteristic variation has occurred in a steering transmission system on the basis of the detection history; a pressure measurement unit configured to measure a pressure in one of a master cylinder and a wheel cylinder that apply a braking force to a vehicle wheel; and a prohibition unit configured to prohibit for a predetermined prohibition period one of detection of the zero point by the steering angle zero point detection unit and updating of the detection history by the history recording unit, when the pressure equals or exceeds a predetermined threshold.

6 Claims, 8 Drawing Sheets

(56) References Cited

U.S. PATENT DOCUMENTS

| | | | |
|---|---|---|---|
| 2008/0086248 A1* | 4/2008 | Lu | G05D 1/0891 701/41 |
| 2008/0142293 A1* | 6/2008 | Goto | B62D 6/008 180/446 |
| 2010/0030428 A1* | 2/2010 | Gartner | G01D 5/2451 701/42 |
| 2011/0218700 A1* | 9/2011 | Mori | B60W 10/06 701/31.4 |
| 2011/0218706 A1* | 9/2011 | Mori | B60W 10/06 701/36 |
| 2014/0142810 A1* | 5/2014 | Watanabe | B62D 15/0245 701/41 |

FOREIGN PATENT DOCUMENTS

| | | |
|---|---|---|
| JP | 11-072508 A | 3/1999 |
| JP | 2004-058895 A | 2/2004 |
| JP | 2004-276734 A | 10/2004 |
| JP | 2005-053447 A | 3/2005 |
| JP | 2008-037132 A | 2/2008 |
| WO | 2013-175522 A1 | 11/2013 |
| WO | 2013175790 A1 | 11/2013 |

\* cited by examiner

STEERING APPARATUS AND CONTROL METHOD THEREOF

INCORPORATION BY REFERENCE

The disclosure of Japanese Patent Application No. 2012-254336, filed on Nov. 20, 2012 including the specification, drawings and abstract, is incorporated herein by reference in its entirety.

BACKGROUND OF THE INVENTION

1. Field of the Invention

The invention relates to a steering apparatus that detects a zero point of a steering angle of a steering wheel, and a control method thereof.

2. Description of Related Art

In a vehicle behavior control technique such as electronic stability control (available as vehicle stability control (VSC)), various types of control are executed using a detection value from a steering angle sensor attached to a steering wheel. When a type of steering angle sensor that outputs a relative angle is used, a zero point of the steering angle sensor is detected first, and then an absolute steering angle is calculated on the basis of the detected zero point. For this purpose, the steering angle zero point needs to be detected with a high degree of precision. Japanese Patent Application Publication No. 2004-276734 (JP 2004-276734 A), for example, describes a technique of detecting the steering angle zero point on the basis of a difference between an estimated yaw rate estimated from the detection value of the steering angle sensor and an actual yaw rate detected by a yaw rate sensor.

When characteristic variation such as looseness occurs in a steering transmission system from the steering wheel to a vehicle wheel, linearity is no longer maintained between the steering angle and a tire angle, leading to variation in a steering feeling and a reduction in a precision with which vehicle state quantities are estimated based on steering angle information. As a result, precision with which the steering angle zero point is detected may also decrease.

SUMMARY OF THE INVENTION

The invention provides a steering apparatus capable of determining with a high degree of precision whether or not characteristic variation has occurred in a steering transmission system, and a control method thereof.

A first aspect of the invention is a steering apparatus including: a steering angle zero point detection unit configured to detect a zero point of a steering angle of a steering wheel; a history recording unit configured to record a detection history of the zero point; a characteristic variation determination unit configured to determine whether or not characteristic variation has occurred in a steering transmission system on the basis of the detection history; a pressure measurement unit configured to measure a pressure in one of a master cylinder and a wheel cylinder that apply a braking force to a vehicle wheel; and a prohibition unit configured to prohibit for a predetermined prohibition period one of detection of the zero point by the steering angle zero point detection unit and updating of the detection history by the history recording unit, when the pressure equals or exceeds a predetermined threshold.

A second aspect of the invention is a steering apparatus control method including: detecting a zero point of a steering angle of a steering wheel; recording a detection history of the zero point; determining whether or not characteristic variation has occurred in a steering transmission system on the basis of the detection history; measuring a pressure in one of a master cylinder and a wheel cylinder that apply a braking force to a vehicle wheel; and when the pressure equals or exceeds a predetermined threshold, prohibiting for a predetermined prohibition period one of detection of the zero point and updating of the detection history.

According to the invention, the determination as to whether or not characteristic variation has occurred in the steering transmission system can be made with a high degree of precision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
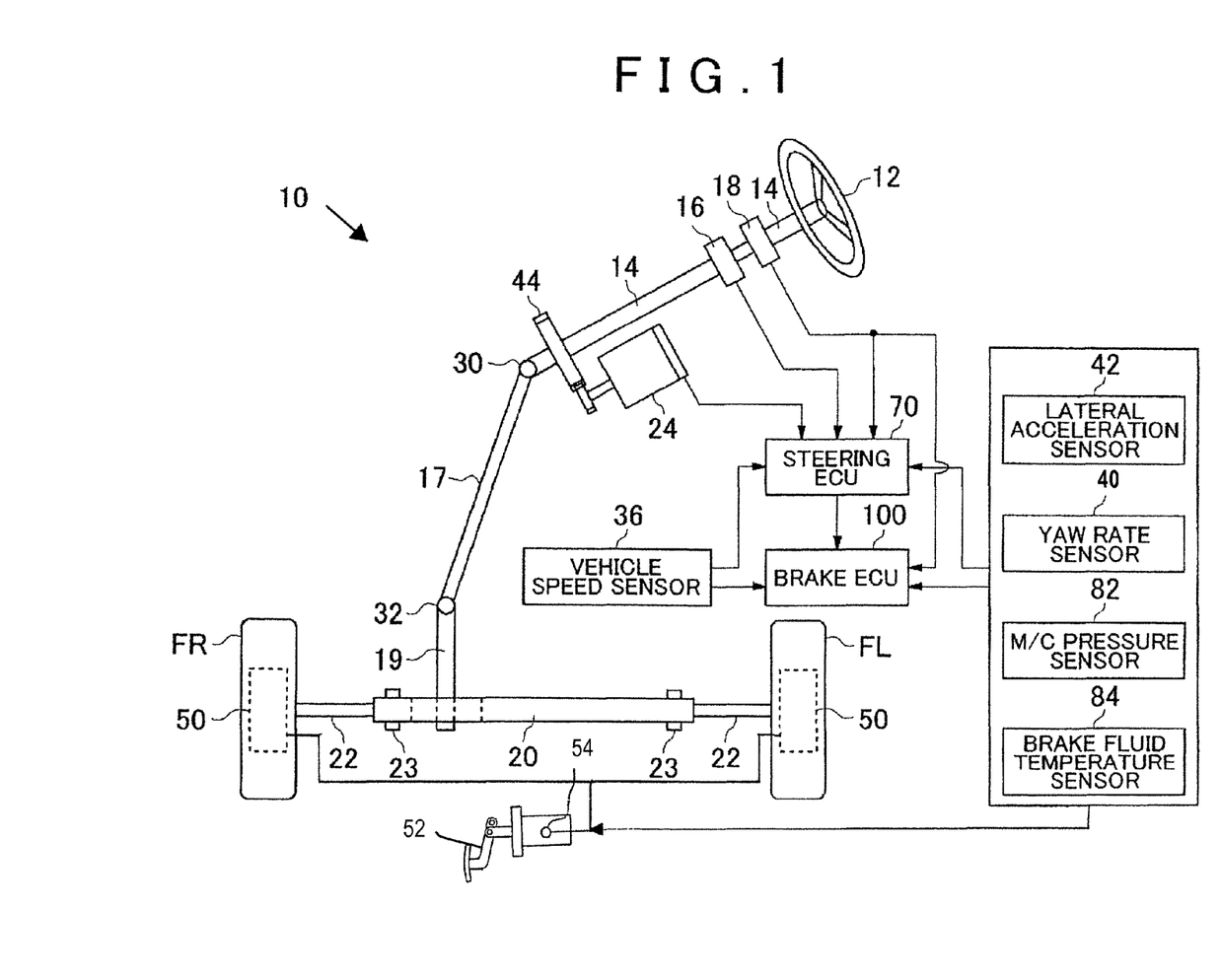
FIG. 1 is a schematic view showing a configuration of a vehicle that includes a steering apparatus according to an embodiment of the invention.

FIG. 1 is a schematic view showing a configuration of a vehicle that includes a steering apparatus 10 according to an embodiment of the invention. FIG. 1 is a schematic view showing a front wheel part of a four-wheel vehicle. An advancement direction of the vehicle is modified by steering a right front wheel FR and a left front wheel FL serving as steered wheels.

The steering apparatus 10 includes an electric power steering (referred to hereafter as an "EPS") device. The EPS includes a steering wheel 12 steered by a driver, a steering shaft 14 coupled to the steering wheel 12, a speed reduction mechanism 44 provided on a lower end of the steering shaft, and a steering assist motor 24 connected to the speed reduction mechanism 44 by an output shaft thereof. The steering assist motor 24 applies an assist force for assisting a steering operation by driving the steering shaft 14 to rotate.

A torsion bar, not shown in the drawing, a steering torque sensor 16 that detects torque generated in the torsion bar, and a steering angle sensor 18 that detects a steering angle of the steering wheel 12 are disposed on the steering shaft 14. Outputs from the respective sensors are transmitted to an ECU 70 and a brake ECU 100.

The steering shaft 14 is coupled to an intermediate shaft 17 and a pinion shaft 19 via universal joints 30, 32. The pinion shaft 19 is provided to extend in a left-right direction of the vehicle (a vehicle width direction), and coupled to a steering gearbox 20 including a rack bar 22 that slides in an axial direction thereof. The intermediate shaft 17 includes a rubber coupling as a part thereof.

The steering gearbox 20 is constructed by meshing a pinion gear formed on one end of the pinion shaft 19 to a rack shaft. Further, the steering gearbox 20 is supported on a vehicle body via a rubber grommet 23.

When the driver operates the steering wheel 12, rotation of the steering shaft 14 is transmitted to the steering gearbox 20 via the shafts 17, 19, and is converted by the steering gearbox 20 into a left-right direction linear motion of the rack bar 22. One end of a tie rod (not shown) is connected to each end of the rack bar 22. The other ends of the respective tie rods are coupled to knuckle arms (not shown) that respectively support the right front wheel FR and the left front wheel FL. The right front wheel FR and the left front wheel FL are steered by the linear motion of the rack bar 22.

A vehicle speed sensor 36 that outputs a vehicle speed by detecting a rotation speed of the vehicle wheel is attached to the vicinity of the vehicle wheel. Instead of using the vehicle speed sensor 36, the vehicle speed may be determined using data from a global positioning system (GPS), not shown in the drawing. A lateral acceleration sensor 42 that detects acceleration of the vehicle body in the left-right direction is also provided on the vehicle body. Detection values from these sensors are transmitted to the brake ECU 100.

The steering ECU 70 calculates a steering torque assist value on the basis of the detection values received from the respective sensors, and outputs a corresponding control signal to the steering assist motor 24. Note that the steering mechanism itself, including the EPS described above, is a conventional mechanism, and therefore further detailed description thereof has been omitted from this specification.

A brake pedal 52 is connected to a master cylinder 54 that feeds brake fluid serving as a working fluid in response to a depression operation performed by the driver. A master cylinder (M/C) pressure sensor 82 provided on a brake oil pressure control pipe that extends from the master cylinder to wheel cylinders 50 measures an oil pressure of the master cylinder and supplies a measurement result to the brake ECU 100. A temperature sensor 84 that measures a temperature of the brake fluid in the brake oil pressure control pipe is also provided. The brake ECU 100 causes the vehicle to generate a braking force on the basis of the master cylinder oil pressure and so on.

To reduce vibration of the steering wheel, regulate a steering feeling, secure compliance steer, and so on, various components of a steering transmission system from the steering wheel to the vehicle wheel are often supported on the vehicle body via elastic members such as rubber grommets, rubber couplings, and rubber bushes. When transmission characteristic variation such as loosening occurs in the steering transmission system due to deterioration of these elastic members over time, linearity is no longer maintained between the steering angle and a tire angle, leading to variation in the steering feeling and a reduction in a precision with which vehicle state quantities based on steering angle information are estimated.

In this embodiment, therefore, as will be described in detail below, when characteristic variation in the elastic members of the steering transmission system is determined to have occurred on the basis of a detection history of a steering angle zero point during vehicle travel, either the driver of the vehicle is notified of this fact or an instruction is issued to stop executing various types of vehicle control that use the steering angle.

Figure 2:
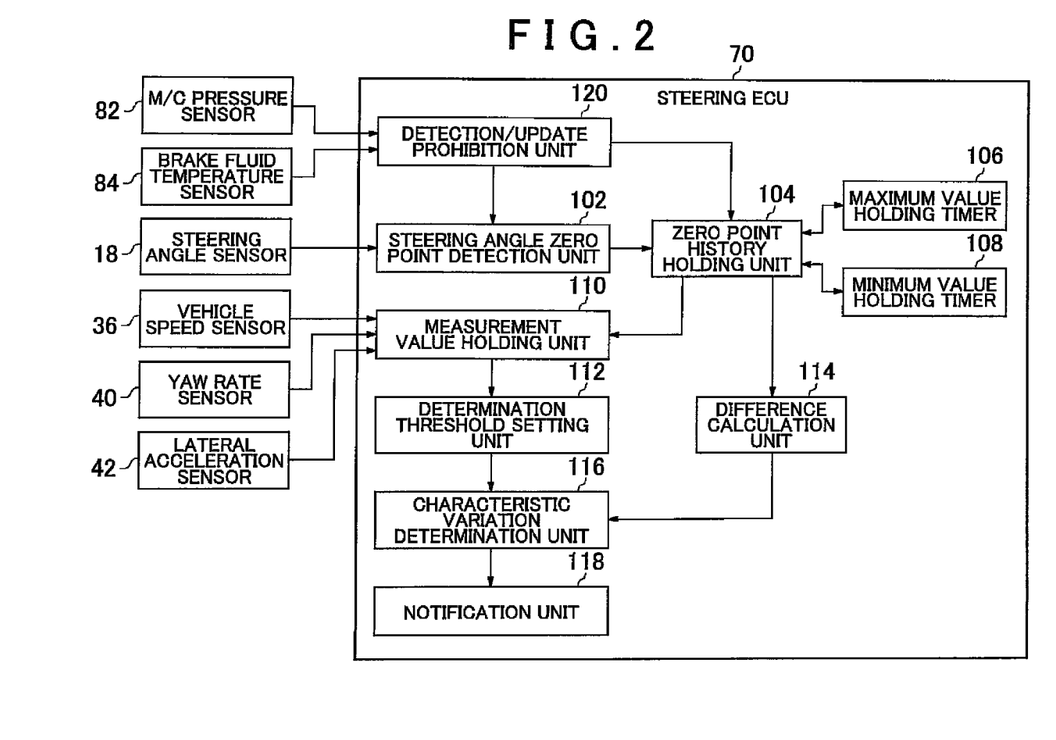
FIG. 2 is a function block diagram showing a configuration of a part of a steering electronic control unit (steering ECU) contributing to the detection of characteristic variation in a steering transmission system according to this embodiment.

FIG. 2 is a function block diagram showing a configuration of a part of the steering ECU 70 that contributes to a characteristic variation determination made in relation to the steering transmission system according to this embodiment. Respective blocks shown in the drawing may be realized in hardware form by elements and electric circuits of a central processing unit (CPU) and a memory of a computer, or in software form by a computer program or the like. Here, however, the respective blocks are depicted as interlinked function blocks. Persons skilled in the art will therefore understand that the function blocks can be realized in various forms by combinations of hardware and software.

A steering angle zero point detection unit 102 detects a zero point (a neutral point) of the steering angle sensor 18 using a desired conventional method. A steering wheel absolute steering angle is calculated on the basis of the detected zero point, and used in various types of vehicle control.

A zero point history holding unit 104 records most recently updated maximum and minimum values of the zero point detected by the steering angle zero point detection unit 102. An operation of the zero point history holding unit 104 will be described in detail below with reference to flowcharts shown in FIGS. 5 to 7.

A maximum value holding timer 106 and a minimum value holding timer 108 are connected to the zero point history holding unit 104. These timers are countdown timers for counting the elapse of time following storage of the zero point maximum value and the zero point minimum value in the zero point history holding unit 104. When a count value of the maximum value holding timer 106 or the minimum value holding timer 108 reaches a predetermined value, the zero point history holding unit 104 cancels the zero point maximum value or the zero point minimum value stored at that point. This operation will be described in detail below with reference to FIG. 3.

A measurement value holding unit 110 receives detection values respectively from the vehicle speed sensor 36, a yaw rate sensor 40, and the lateral acceleration sensor 42, and records the vehicle speed, a yaw rate, and the lateral acceleration at the time of updating of the zero point maximum value or the zero point minimum value by the zero point history holding unit 104.

A determination threshold setting unit 112 calculates a determination threshold for determining whether or not characteristic variation, or more specifically loosening caused by deterioration of the elastic members such as rubber bushes, has occurred in the steering transmission system using the vehicle speed, yaw rate, and lateral acceleration recorded in the measurement value holding unit 110.

The determination threshold is set in consideration of respective errors in the vehicle speed sensor, the yaw rate sensor, the lateral acceleration sensor, and the steering angle sensor, processing variation in the respective components, and assembly variation in the vehicle, as will be described in detail below with reference to FIG. 5. Alternatively, a zero point detection history of a normal vehicle may be obtained, and the determination threshold may be set at a value greatly exceeding a zero point detection result obtained from the normal vehicle (a value twice as large as the zero point detection result or the like, for example).

A difference calculation unit 114 calculates a difference D between the zero point maximum value and the zero point minimum value recorded in the zero point history holding unit 104.

A characteristic variation determination unit 116 determines whether or not the difference D calculated by the difference calculation unit 114 exceeds a predetermined determination threshold T. When the difference D exceeds the determination threshold T, it is determined that characteristic variation has occurred in the steering transmission system.

When the characteristic variation determination unit 116 determines that characteristic variation has occurred, a notification unit 118 either notifies the driver of the vehicle of this fact or instructs a vehicle control ECU, not shown in the drawing, to stop executing the various types of vehicle control that use the steering angle.

Figure 3:
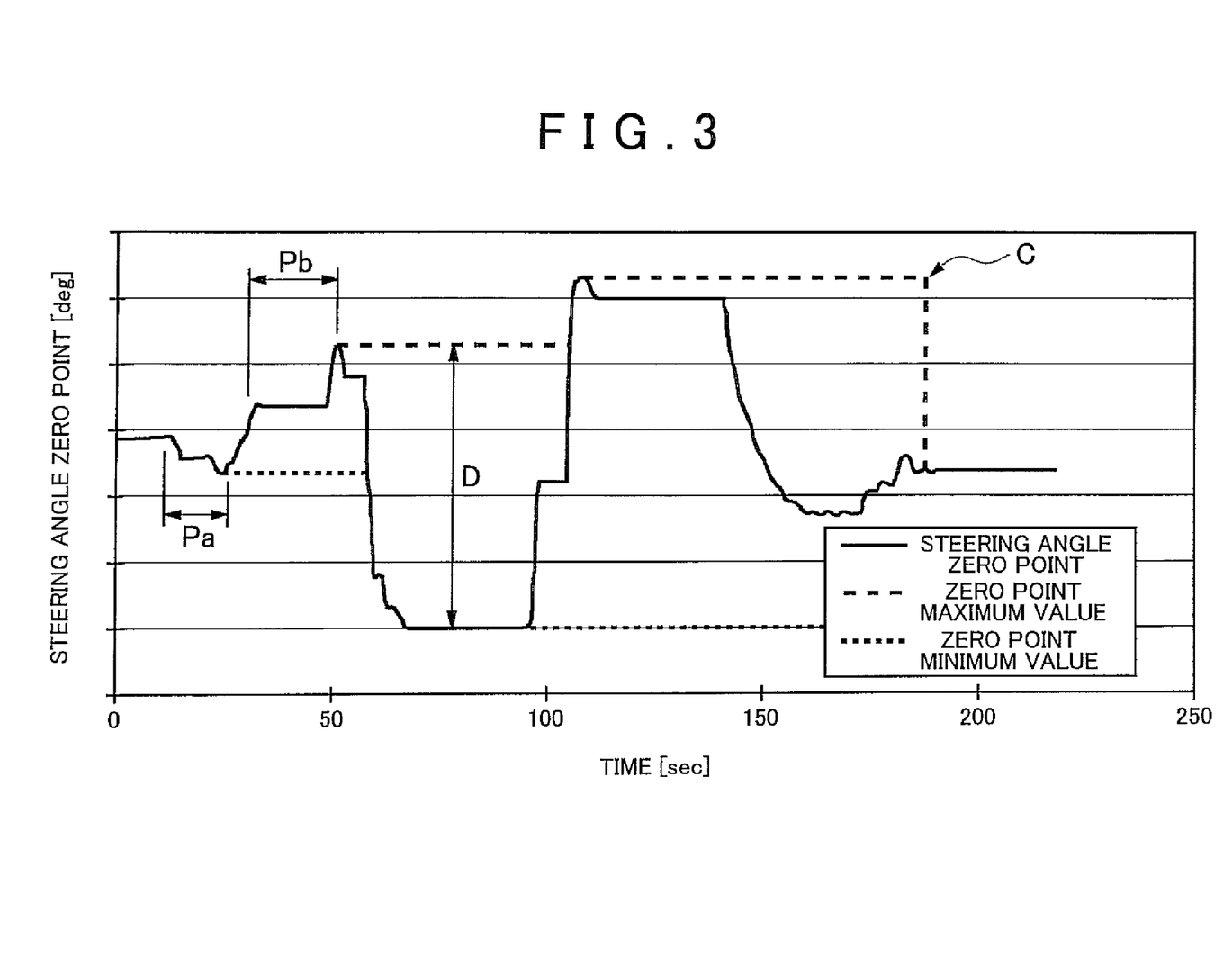
FIG. 3 is a graph showing an example of histories of a zero point, maximum value and a zero point minimum value.

Next, using FIG. 3, a method employed by the steering ECU 70 to determine the occurrence of characteristic variation in the steering transmission system will be described. FIG. 3 is a graph showing an example of histories of the zero point maximum value and the zero point minimum value.

The abscissa of FIG. 3 shows elapsed time, and the ordinate shows a detected steering angle zero point θ. It is assumed in the following description that at a time 0, the zero point maximum value and the zero point minimum value are reset to a current steering angle zero point detection value (an initial value).

In a period Pa shown in the drawing, the steering angle zero point detection value falls below the initial value of the zero point minimum value, and therefore the zero point history holding unit 104 updates the zero point minimum value. Further, in a period Pb, the steering angle zero point detection value exceeds the initial value of the zero point maximum value, and therefore the zero point history holding unit 104 updates the zero point maximum value. Thereafter, the zero point maximum value and the zero point minimum value are updated every time the steering angle zero point detection value exceeds the held zero point maximum value or falls below the held zero point minimum value.

The difference calculation unit 114 calculates the difference D between the zero point maximum value and the zero point minimum value. The characteristic variation determination unit 116 compares the difference D with the threshold T set by the determination threshold setting unit 112, and when the difference D exceeds the threshold T, determines that characteristic variation (i.e. deterioration of the elastic members) has occurred in the steering transmission system. This determination is based on the fact that when loosening occurs due to deterioration of the elastic members in the steering transmission system, the steering angle zero point detection value is likely to vary greatly during a steering wheel operation.

The maximum value holding timer 106 and the minimum value holding timer 108 count the elapsed time following the latest respective updates of the zero point maximum value and the zero point maximum value. When a predetermined time elapses, the zero point history holding unit 104 resets the zero point maximum value or the zero point minimum value to the current steering angle zero point detection value. In FIG. 3, variation in the zero point maximum value at a point C corresponds to this processing.

As described above, the steering ECU 70 determines whether or not characteristic variation has occurred in the steering transmission system on the basis of a comparison between the maximum value and minimum value of the steering angle zero point of the steering wheel and the determination threshold calculated from the lateral acceleration and so on. Immediately after the vehicle shifts from a braking condition to a non-braking condition, however, the wheel cylinder pressure of the vehicle wheel may not be fully released, and as a result, the vehicle may advance in a condition where the steering wheel is steered by braking force slippage. In such a situation, the steering angle zero point detection value tends to be larger than a value obtained not immediately after braking, and therefore the difference D cannot be calculated accurately after the zero point maximum value or the zero point minimum value is updated by the zero point history holding unit 104. When the characteristic variation determination described above is implemented using this inaccurate difference D, the occurrence of characteristic variation in the steering transmission system may be determined erroneously even though the elastic members have not deteriorated over time.

Hence, in this embodiment, the determination as to whether or not Characteristic variation has occurred in the steering transmission system is prohibited for a fixed period after a point at which the master cylinder pressure at which braking force is applied to the vehicle wheel falls to or below a predetermined braking determination threshold.

A detection/update prohibition unit 120 shown in FIG. 2 prohibits, for a predetermined period after the master cylinder pressure detected by the master cylinder pressure sensor 82 falls to or below a predetermined braking determination threshold $T_P$ during vehicle braking, updating of the zero point maximum value and the zero point minimum value by the zero point history holding unit 104.

Figure 4A:
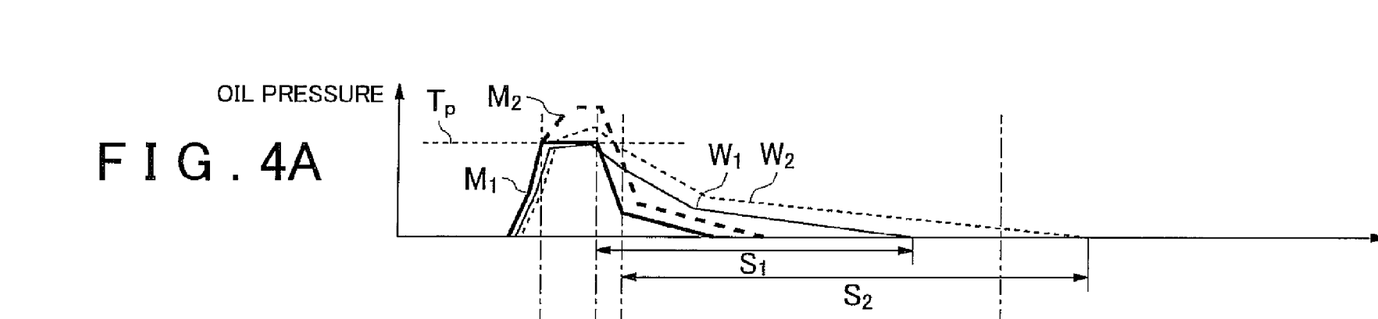
FIGS. 4A to 4C are views illustrating an operation of a detection/update prohibition unit.
Figure 4B:
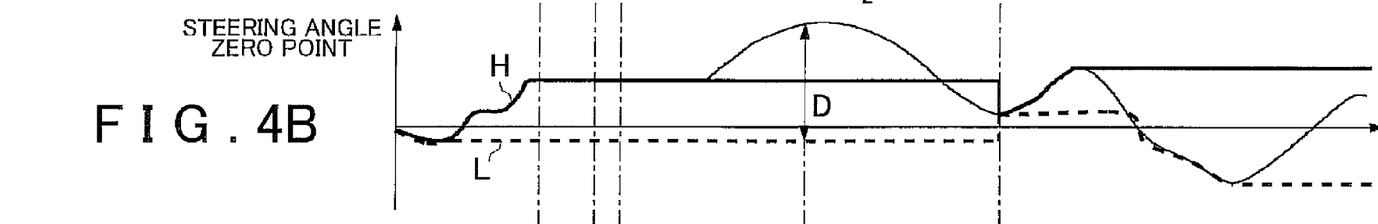
Figure 4C:
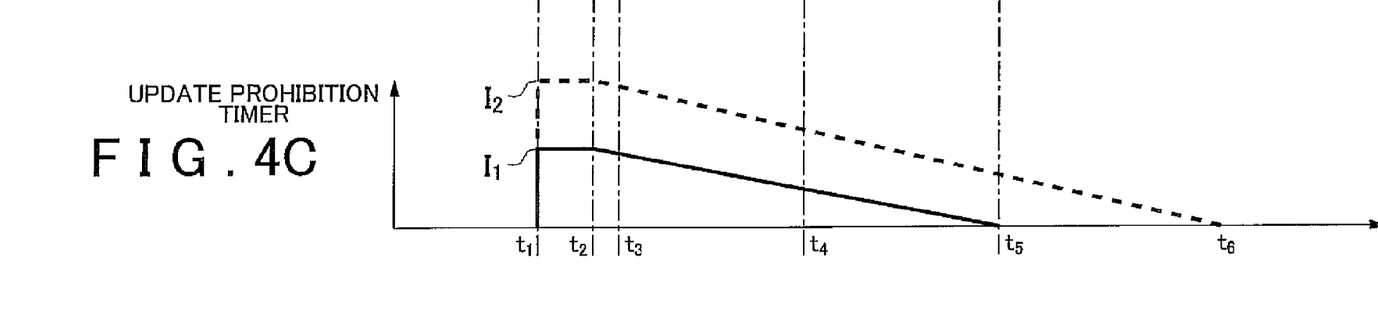

FIGS. 4A to 4C are views illustrating an operation of the detection/update prohibition unit 120. A thick line in FIG. 4A shows temporal variation in the master cylinder (M/C) pressure of the vehicle, and a thin line shows temporal variation in the wheel cylinder (W/C) pressure. A thin solid line in FIG. 4B shows temporal variation in the value of the steering angle zero point detected by the steering angle zero point detection unit 102, while a thick solid line H shows the zero point maximum value recorded in the zero point history holding unit 104 and a thick dotted line L shows the zero point minimum value recorded in the zero point history holding unit 104. Further, FIG. 4C shows a value of a timer set by the detection/update prohibition unit 120.

Referring to FIG. 4A, a relationship between the master cylinder pressure and the wheel cylinder pressure will be described. After a master cylinder pressure $M_1$ reaches the braking determination threshold $T_P$ at a time $t_1$ in response to a brake pedal operation, the wheel cylinder pressure $W_1$ follows at a slight delay. When the brake pedal is released at a time $t_2$, the master cylinder pressure $M_1$ decreases rapidly, whereas it takes a considerable amount of time for the wheel cylinder pressure $W_1$ to return to zero ($S_1$ in FIG. 4A). This following delay in the wheel cylinder pressure is a cause of the braking force slippage mentioned above.

Hence, the detection/update prohibition unit 120 sets an update prohibition timer at an initial value $I_1$ at the time $t_1$ at which the master cylinder pressure $M_1$ reaches or exceeds the predetermined braking determination threshold $T_P$. Decrementing of the update prohibition timer is then started from a time $t_2$ at which the master cylinder pressure $M_1$ falls to or below the braking determination threshold $T_P$. Note that the braking determination threshold $T_P$ is preferably set at a lower limit value of the master cylinder pressure at which the aforesaid braking force slippage may occur.

The detection/update prohibition unit 120 prohibits updating of the zero point maximum value and the zero point minimum value by the zero point history holding unit 104 until the value of the update prohibition timer reaches zero (between times $t_2$ and $t_5$ in the drawing). As a result, a zero point maximum value H and a zero point minimum value L remain at fixed values regardless of variation in the steering angle zero point detection value shown in FIG. 4B. Hence, the characteristic variation determination unit 116 dues not determine that characteristic variation has occurred in the steering transmission system even in a situation where the difference D (see FIG. 3) would exceed the characteristic variation determination threshold T at a time $t_4$, for example, if updating of the zero point maximum value were continued. In other words, until the value of the update prohibition timer reaches zero, the zero point maximum value H and the zero point minimum value L remain fixed regardless of variation in the steering angle zero point detection value, and therefore characteristic variation is not determined to have occurred.

The update prohibition period must be set at a time equal to or longer than a time ($S_1$ in FIG. 4A) required for the remaining wheel cylinder pressure to reach zero so that braking force slippage is eliminated. The initial value $I_1$ of the update prohibition timer is set to satisfy this condition.

During vehicle braking, a time ($S_2$ in FIG. 4A, for example) required for the wheel cylinder pressure ($W_2$ in FIG. 4A) to return to zero increases as the master cylinder pressure ($M_2$ in FIG. 4A) increases, and therefore the detection/update prohibition unit 120 may set the initial value of the update prohibition timer at a steadily larger value as an immediately preceding master cylinder pressure increases. As shown in FIG. 4C, when the initial value of the update prohibition timer is set at $I_2$, for example, the period in which updating of the zero point maximum value and the zero point minimum value is prohibited extends to a time $t_6$, which is longer than the time $S_2$ required for the wheel cylinder pressure $W_2$ to return to zero.

Further, when the temperature of the brake fluid is low, a viscosity of the brake fluid tends to increase, leading to an increase in the amount of time required for the wheel cylinder pressure to return to zero. Hence, the detection/update prohibition unit 120 may set the initial value of the update prohibition tinier at a steadily larger value as the temperature of the brake fluid, which is measured by the brake fluid temperature sensor 84, decreases. The temperature of the brake fluid may be estimated from a measurement value obtained by an outside air temperature sensor (not shown).

An appropriate initial value of the update prohibition timer can be determined in an experiment or a simulation.

Figure 5:
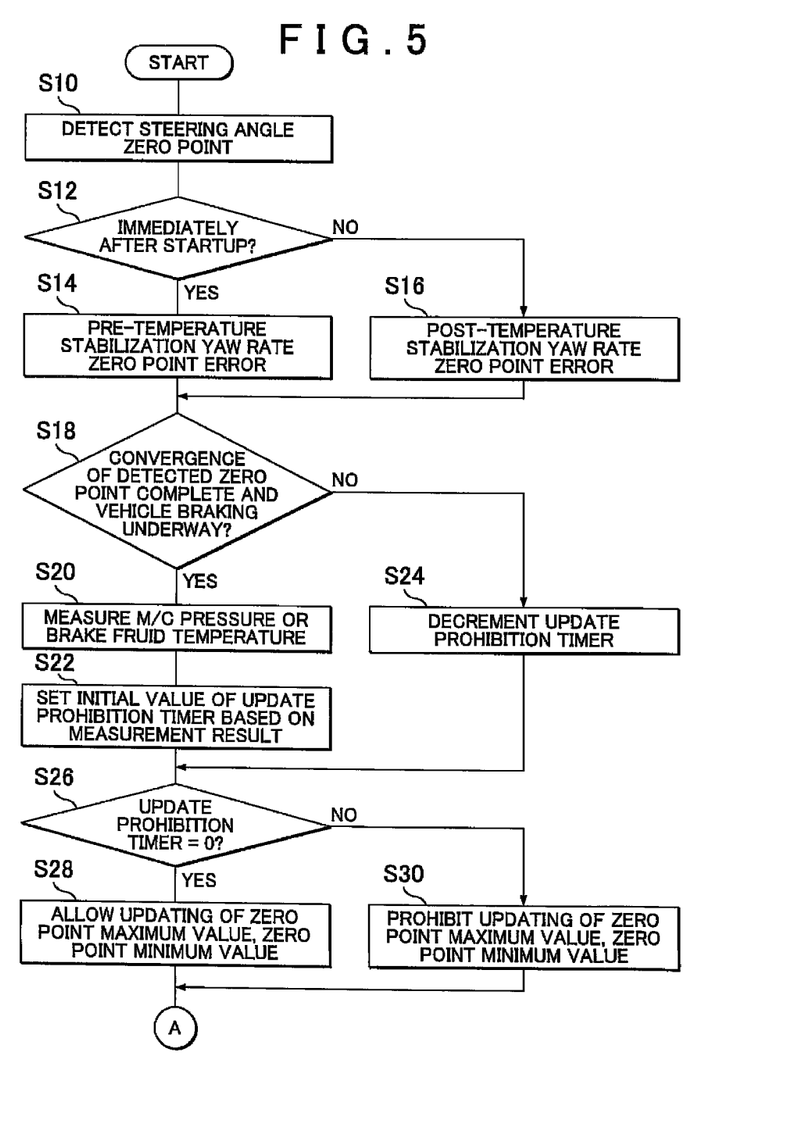
FIG. 5 is a flowchart illustrating characteristic variation detection according to this embodiment of the invention.
Figure 6A:
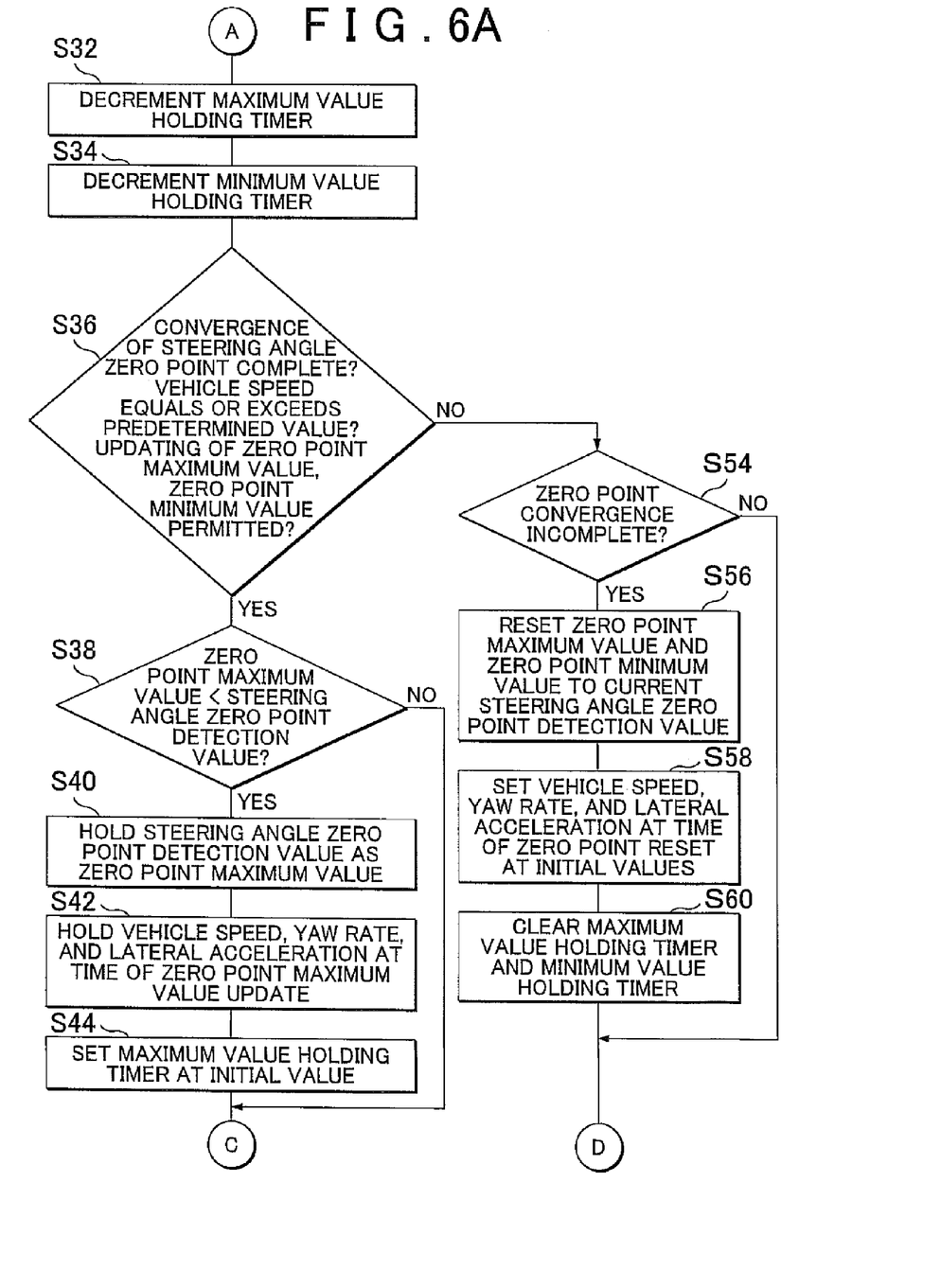
FIGS. 6A and 6B are flowcharts illustrating the characteristic variation detection according to this embodiment of the invention.
Figure 6B:
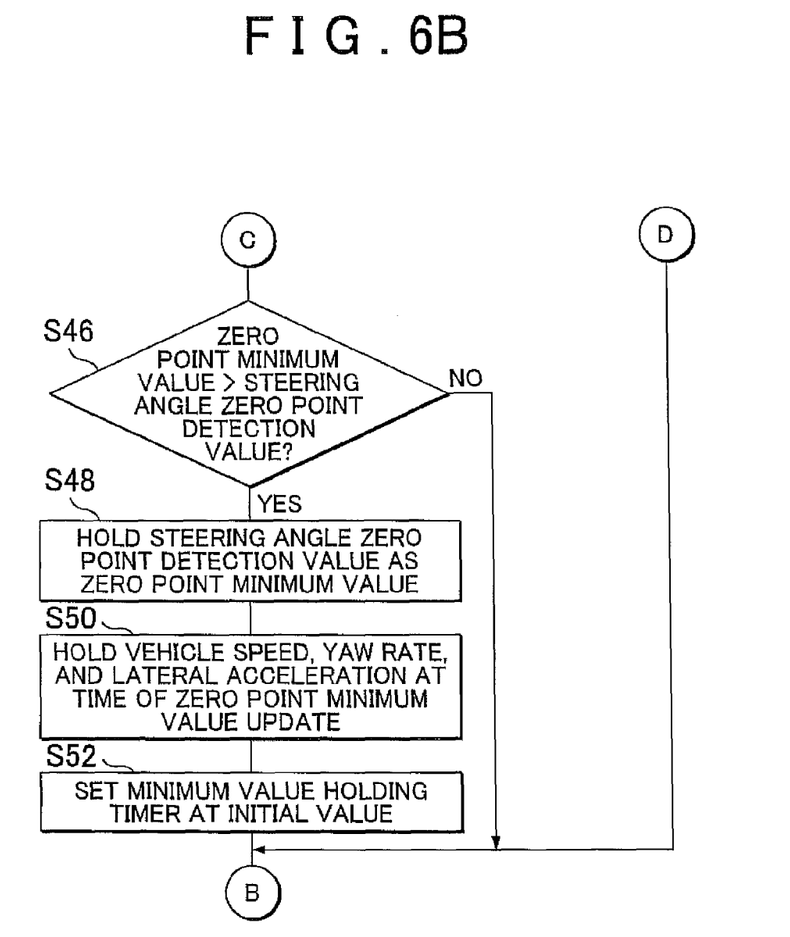
Figure 7:
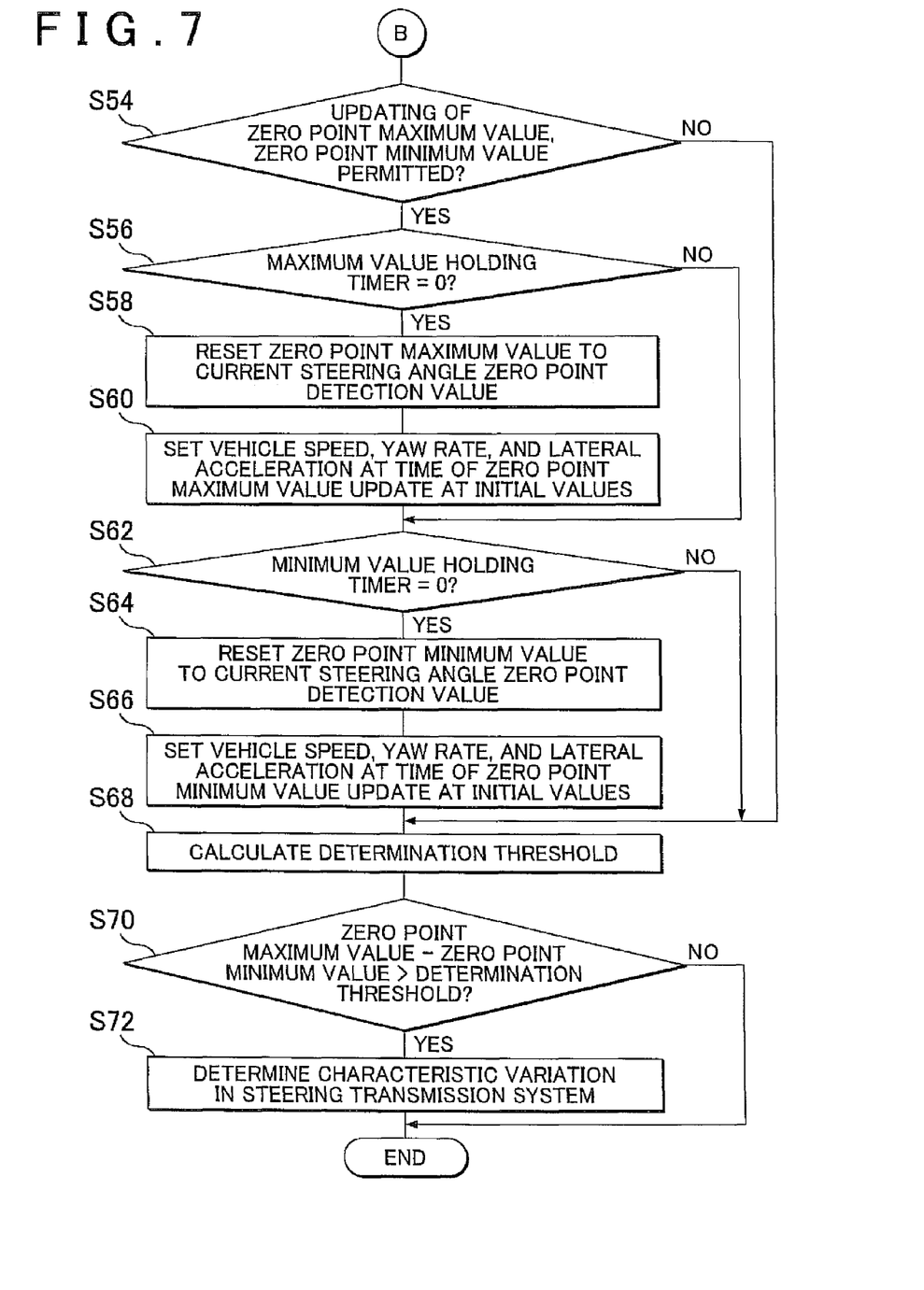
FIG. 7 is a flowchart illustrating the characteristic variation detection according to this embodiment of the invention.

FIGS. 5 to 7 are flow charts illustrating detection of characteristic variation in the steering transmission system according to this embodiment. This flow is executed repeatedly at predetermined intervals (one second intervals, for example) during vehicle travel.

First, referring to FIG. 5, the steering angle zero point detection unit 102 detects the steering angle zero point θ of the steering wheel on the basis of the detection value obtained by the steering angle sensor 18 (S10). The determination threshold setting unit 112 determines whether or not a current time is immediately after startup of the vehicle (S12). When the current time is immediately after startup of the vehicle (Yes in S12), the temperature of the yaw rate sensor 40 is assumed to be unstable, and therefore a pre-temperature stabilization yaw rate zero point error is selected (S14). When the current time is not immediately after startup (No in S12), the temperature of the yaw rate sensor 40 is assumed to be stable, and therefore a post-temperature stabilization yaw rate zero point error is selected (S16).

Next, the detection/update prohibition unit 120 determines whether or not convergence of the steering angle zero point is complete and whether or not the master cylinder pressure equals or exceeds the braking determination threshold $T_P$ (S18). When convergence of the steering angle zero point is complete and the master cylinder pressure equals or exceeds the braking determination threshold $T_P$ (Yes in S18), the detection/update prohibition unit 120 obtains the master cylinder pressure measured by the master cylinder pressure sensor 82 and/or the brake fluid temperature measured by the brake fluid temperature sensor 84 (S20), and sets the initial value of the update prohibition timer in accordance with the obtained value (S22). When the master cylinder pressure is smaller than the braking determination threshold $T_P$ (No in S18), the detection/update prohibition unit 120 decrements the update prohibition timer by one (S24). Note that zero is set in advance as a lower limit guard value of the update prohibition timer.

The detection/update prohibition unit 120 then determines whether or not the value of the update prohibition timer is zero (S26). When the update prohibition timer is not at zero (No in S26), updating of the zero point maximum value and the zero point minimum value by the zero point history holding unit 104 is prohibited (S30). When the processing of S24 is repeated such that the update prohibition timer reaches zero (Yes in S26), updating of the zero point maximum value and the zero point minimum value by the zero point history holding unit 104 is permitted (S28).

Next, referring to FIGS. 6A and 6B, the zero point history holding unit 104 decrements the maximum value holding timer 106 and the minimum value holding timer 108 (S32, S34). Note that the initial values of these timers are set in steps S44 and S52, to be described below, but immediately after a startup, the initial values are not set, and therefore a lower limit guard value is set in advance at zero.

The determination threshold setting unit 112 determines whether or not convergence of the steering angle zero point is complete, the vehicle speed equals or exceeds a predetermined value, and updating of the zero point maximum value and the zero point minimum value is permitted (S36). When the vehicle speed is low, errors caused by component variation, sensor tolerance, and so on tend to be larger than when the vehicle speed is high, and therefore the likelihood of an erroneous determination of the occurrence of characteristic variation increases. At a low speed (lower than 30 km/h, for example), therefore, the determination as to the occurrence of characteristic variation in the steering transmission system is not executed.

When the vehicle speed is lower than the predetermined value (No in S36), a determination is made as to whether or not convergence of the steering angle zero point is incomplete (S54). During an initial determination, convergence of the steering angle zero point is not complete (Yes in S54), and therefore the processing advances to S56, where the zero point history holding unit 104 resets the stored zero point maximum value and zero point minimum value to the current steering angle zero point detection value (S56). In response, the measurement value holding unit 110 stores the vehicle speed, yaw rate, and lateral acceleration at the time of the reset as initial values (S58). The zero point history holding unit 104 then clears the maximum value holding timer 106 and the minimum value holding timer 108 (S60). When, in S54, convergence of the steering angle zero point is complete (No in S54), S56 to S60 are skipped.

When, in S36, convergence of the steering angle zero point is complete, the vehicle speed equals or exceeds the predetermined value, and updating of the zero point maximum value and the zero point minimum value is permitted (Yes in S36), the zero point history holding unit 104 determines whether or not the current steering angle zero point detection value is larger than the stored zero point maximum value, or in other words whether or not it is necessary to update the zero point maximum value (S38). When the steering angle zero point detection value is equal to or smaller than the zero point maximum value (No in S38), S40 to S44 are skipped. When the steering angle zero point detection value is larger than the zero point maximum value (Yes in S38), the zero point history holding unit 104 stores the steering angle zero point detection value as the new zero point maximum value (S40), and the measurement value holding unit 110 stores the vehicle speed, yaw rate, and lateral acceleration at the time of the maximum value update (S42). The maximum value holding timer 106 is set at a predetermined initial value (180 seconds, for example) (S44).

Next, the zero point history holding unit 104 determines whether or not the current steering angle zero point detection value is smaller than the stored zero point minimum value, or in other words whether or not it is necessary to update the zero point minimum value (S46). When the steering angle zero point detection value equals or exceeds the zero point minimum value (No in S46), S48 to S52 are skipped. When the steering angle zero point detection value is smaller than the zero point minimum value (Yes in S46), the zero point history holding unit 104 stores the steering angle zero point detection value as the new zero point minimum value (S48), and the measurement value holding unit 110 stores the vehicle speed, yaw rate, and lateral acceleration at the time of the minimum value update (S50). The minimum value holding timer 108 is set at a predetermined initial value (S52).

Next, referring to FIG. 7, a determination is made as to whether or not updating of the zero point maximum value and the zero point minimum value is permitted (S54). When updating is prohibited (No in S54), the processing advances to S68. When updating is permitted (Yes in S54), the zero point history holding unit 104 determines whether or not the count value of the maximum value, holding timer is zero (S56). When the count value is zero (Yes in S56), the zero point history holding unit 104 resets the held zero point maximum value to the current steering angle zero point detection value (S58), and the measurement value holding unit 110 likewise resets the held vehicle speed, yaw rate, and lateral acceleration at the time of the maximum value update to the initial values (S60).

Further, the zero point history holding unit 104 determines whether or not the count value of the minimum value holding timer is zero (S62). When the count value is zero (Yes in S62), the zero point history holding unit 104 resets the held zero point minimum value to the current steering angle zero point detection value (S64), and the measurement value holding unit 110 likewise resets the held vehicle speed, yaw rate, and lateral acceleration at the time of the minimum value update to the initial values (S66).

The processing of S56 to S66 corresponds to zero point maximum value and minimum value resetting processing performed to minimize the effect of variation in the zero point of the steering angle sensor due to temperature variation. The reason for performing this resetting processing is as follows. The zero point of an analog sensor such as the yaw rate sensor 40 or the lateral acceleration sensor 42 may vary due to temperature variation. When the zero points of the respective sensors vary due to variation in the temperature inside a vehicle cabin, the steering angle zero point detection value also varies, making it difficult to determine whether the difference D between the zero point maximum value and the zero point minimum value is due to characteristic variation in the steering transmission system or due to temperature variation. Hence, taking into consideration the fact that, in a normal environment, short-term temperature variation in the vehicle cabin is extremely small, the zero point maximum value and the zero point minimum value are canceled every time a predetermined period elapses following the previous update.

Next, the determination threshold setting unit 112 calculates the determination threshold T on the basis of a following equation (S68).

$$T = \{(\theta \times V)/(n \times L) - Kh \times Gy \times V - YR\} \times n \times L \times (1/V) = \theta - Kh \times Gy/n \times L - YR \times n \times L \times (1/V) \quad (1)$$

Here, $\theta$ is the steering angle detection value, V is the vehicle speed, Gy is the lateral acceleration, YR is the yaw rate, Kh is a stability factor, n is an overall steering gear ratio, and L is a wheel base.

In Equation (1), calculation of "$(\theta \times V)/(n \times L) - Kh \times Gy \times V$" corresponds to calculation of a target yaw rate. Accordingly, calculation of "$\{(\theta \times V)/(n \times L) - Kh \times Gy \times V - YR\} \times n \times L \times (1/V)$" corresponds to determination of a steering angle conversion value of a value obtained by subtracting an actual yaw rate from the target yaw rate.

Equation (1) corresponds to a sum of (i) a steering angle error caused by a zero point/gain error in the steering angle sensor and a zero point error in the lateral acceleration sensor, (ii) a steering angle error caused by a gain error in the lateral acceleration sensor and individual differences among vehicles, (iii) a steering angle error caused by a zero point error in the yaw rate sensor, and (iv) a steering angle error caused by gain errors in the yaw rate sensor and the vehicle speed sensor.

Note that as the vehicle speed, yaw rate, and lateral acceleration to be substituted into Equation (1), the smaller vehicle speed and the larger yaw rate and lateral acceleration are preferably selected from the values stored in the measurement value holding unit 110 (i.e. the value stored at the time of the zero point maximum value update and the value stored at the time of the zero point minimum value update). The reason for this is that the steering angle error tends to be larger at low speeds than at high speeds, and therefore, when a large steering angle error calculated during low speed travel is compared with a small determination threshold calculated during high speed travel, the occurrence of characteristic variation may be determined erroneously. To avoid this situation, the above values are preferably selected.

The difference calculation unit 114 calculates the difference D between the zero point maximum value and the zero point minimum value held in the zero point history holding unit 104, and the characteristic variation determination unit 116 determines whether or not the difference D is larger than the determination threshold T (S70). When the difference D is larger than the determination threshold T (Yes in S70), the characteristic variation determination unit 116 determines that characteristic variation has occurred in the steering transmission system (S72), whereupon the notification unit 118 informs the driver thereof by lighting a predetermined lamp, using a buzzer, or the like, or instructs the vehicle control ECU to temporarily stop vehicle control based on detection of the steering angle zero point.

The processing of S70 is performed to determine whether or not a variation width of the steering angle zero point, or in other words the difference D between the zero point maximum value and the zero point minimum value, exceeds the determination threshold T, which is an accumulation of the zero point errors and gain errors in the steering angle sensor, the vehicle speed sensor, the lateral acceleration sensor, and the yaw rate sensor, and individual differences among vehicles. In other words, when the variation width of the steering angle zero point is larger than an imaginable accumulation of errors in the respective sensors, it is determined that the steering angle zero point has shifted due to loosening in the steering transmission system.

According to this embodiment, as described above, characteristic variation in the steering transmission system due to temporal deterioration of the elastic members that connect the respective components of the steering transmission system to the vehicle body and so on can be detected.

Further, during braking in the vehicle, updating of the zero point maximum value and the zero point minimum value by the zero point history holding unit 104 is prohibited for a predetermined period in S30 of FIG. 5. Accordingly, the processing advances to No in S36 and No in S54 such that updating and resetting of the zero point maximum value and the zero point minimum value are not performed, and therefore the difference D between the zero point maximum value and the zero point minimum value does not exceed the determination threshold T. As a result, the possibility that characteristic variation in the steering transmission system will be determined to have occurred due to braking force slippage immediately after the vehicle shifts from a braking condition to a non-braking condition can be eliminated, and therefore an erroneous determination can be suppressed.

The invention was described above on the basis of embodiments. These embodiments are merely examples, and a person skilled in the art will understand that modified examples such as desired combinations of the embodiments and desired combinations of constituent elements and processes of the embodiments are also within the scope of the invention.

The invention is not limited to the embodiments described above, and various design modifications and other amendments may be added thereto on the basis of knowledge of persons skilled in the art. The configurations shown in the drawings are provided to illustrate examples, and may be modified appropriately as long as similar functions can be realized thereby.

In the embodiments, the detection/update prohibition unit 120 prohibits the determination as to whether or not characteristic variation has occurred in the steering transmission system for a predetermined period on the basis of the value of the master cylinder pressure detected by the master cylinder pressure sensor 82. However, similar processing may be implemented on the basis of the value of the wheel cylinder pressure, which is detected by a wheel cylinder pressure sensor not shown in the drawings.

In the embodiments, the steering ECU 70 determines whether or not characteristic variation has occurred in the steering transmission system, but the characteristic variation determination may be implemented by the brake ECU 100.

Several embodiments were described heretofore with reference to a vehicle that includes an EPS apparatus. However, the invention may also be applied to a vehicle that includes a hydraulic power steering apparatus. In this case, the vehicle does not include a steering ECU, and therefore the determination as to whether or not characteristic variation has occurred in the steering transmission system according to the invention is implemented by an electronic stability control ECU instead.

In the embodiments, the detection/update prohibition unit 120 prohibits updating of the zero point maximum value and the zero point minimum value by the zero point history holding unit 104 for a predetermined period when the master cylinder pressure equals or exceeds the predetermined braking determination threshold. Instead, however, the detection/update prohibition unit 120 may be operated to prohibit detection of the steering angle zero point by the steering angle zero point detection unit 102 for a predetermined period when the master cylinder pressure equals or exceeds the predetermined braking determination threshold. Likewise with this configuration, the zero point maximum value and the zero point minimum value remain at fixed values throughout the predetermined period, and therefore the characteristic variation determination unit 116 does not determine that characteristic variation has occurred in the steering transmission system.

What is claimed is:

1. A steering apparatus comprising:
   a steering angle zero point detection unit that detects a zero point of a steering angle of a steering wheel;
   a history recording unit that records a detection history of the zero point;
   a characteristic variation determination unit that determines whether or not characteristic variation has occurred in a steering transmission system on the basis of the detection history;
   a pressure measurement unit that measures a pressure in one of a master cylinder and a wheel cylinder that apply a braking force to a vehicle wheel; and
   a prohibition unit that prohibits for a predetermined period one of detection of the zero point by the steering angle zero point detection unit and updating of the detection history by the history recording unit, when the pressure equals or exceeds a predetermined threshold.

2. The steering apparatus according to claim 1, wherein the prohibition unit sets the predetermined period to be longer as the pressure increases.

3. The steering apparatus according to claim 1, wherein the prohibition unit sets the predetermined period to be longer as a brake fluid temperature decreases.

4. The steering apparatus according to claim 1, wherein:
   the history recording unit records, as the detection history of the zero point, a maximum value and a minimum value of the zero point; and
   the characteristic variation determination unit determines that characteristic variation has occurred in the steering transmission system when a difference between the maximum value and the minimum value is larger than a determination threshold.

5. The steering apparatus according to claim 4, wherein the history recording unit updates the maximum value when the zero point detected by the steering angle zero point detection unit is larger than the maximum value, and updates the minimum value when the zero point detected by the steering angle zero point detection unit is smaller than the minimum value.

6. The steering apparatus according to claim 5, wherein the history recording unit cancels the maximum value when a predetermined maximum value holding period elapses following a previous update of the maximum value, and cancels the minimum value when a predetermined minimum value holding period elapses following a previous update of the minimum value.

* * * * *